(12) United States Patent
Miyagawa et al.

(10) Patent No.: US 8,174,746 B2
(45) Date of Patent: May 8, 2012

(54) OSCILLATOR DEVICE AND OPTICAL DEFLECTOR USING THE SAME

(75) Inventors: Suguru Miyagawa, Tokyo (JP); Jun Nagatoshi, Mishima (JP); Yasuhiro Shimada, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 12/600,763

(22) PCT Filed: Jul. 11, 2008

(86) PCT No.: PCT/JP2008/062971
§ 371 (c)(1),
(2), (4) Date: Nov. 18, 2009

(87) PCT Pub. No.: WO2009/011409
PCT Pub. Date: Jan. 22, 2009

(65) Prior Publication Data
US 2010/0149612 A1    Jun. 17, 2010

(30) Foreign Application Priority Data

Jul. 13, 2007   (JP) .................................. 2007-183822
Apr. 16, 2008   (JP) .................................. 2008-106278

(51) Int. Cl.
*G02B 26/08*   (2006.01)
(52) U.S. Cl. .................... 359/199.1; 359/224.1
(58) Field of Classification Search .................. 359/871, 359/872, 223.1–226.1, 200.1, 212.1–214.1, 359/199.1
See application file for complete search history.

(56) References Cited

U.S. PATENT DOCUMENTS

| | | | |
|---|---|---|---|
| 6,201,226 B1 | 3/2001 | Shimada et al. |
| 6,215,114 B1 | 4/2001 | Yagi et al. |
| 6,333,497 B2 | 12/2001 | Shimada et al. |
| 6,335,522 B1 | 1/2002 | Shimada et al. |
| 6,408,123 B1 | 6/2002 | Kuroda et al. |
| 6,436,265 B1 | 8/2002 | Shimada et al. |
| 6,477,132 B1 | 11/2002 | Azuma et al. |
| 6,900,925 B2 | 5/2005 | Kato et al. |
| 7,038,834 B2 | 5/2006 | Kato et al. |
| 7,220,009 B2 | 5/2007 | Shimada et al. |
| 7,239,437 B2 | 7/2007 | Turner |
| 7,271,943 B2 | 9/2007 | Yasuda et al. |
| 7,355,774 B2 | 4/2008 | Kato et al. |
| 7,388,702 B2 | 6/2008 | Yasuda et al. |

(Continued)

FOREIGN PATENT DOCUMENTS

EP    1 215 168    6/2002

(Continued)

OTHER PUBLICATIONS

International Search Report of PCT/JP2008/062971.

*Primary Examiner* — Euncha Cherry
(74) *Attorney, Agent, or Firm* — Fitzpatrick, Cella, Harper & Scinto

(57) ABSTRACT

An oscillator device includes at least one movable element supported for oscillatory motion around a rotational axis, and a first rectifying member for suppressing generation of a spiral airflow during oscillation of the movable element, the first rectifying member being provided to occupy a space of at least a portion of a spiral airflow generating region which might otherwise be created when the first rectifying member is not provided there.

11 Claims, 13 Drawing Sheets

U.S. PATENT DOCUMENTS

| | | |
|---|---|---|
| 7,423,795 B2 | 9/2008 | Kato et al. |
| 7,446,920 B2 | 11/2008 | Kato et al. |
| 7,474,452 B2 | 1/2009 | Yasuda et al. |
| 7,518,774 B2 | 4/2009 | Kato et al. |
| 7,643,198 B2 | 1/2010 | Yasuda et al. |
| 2002/0071166 A1 | 6/2002 | Jin et al. |
| 2002/0097952 A1* | 7/2002 | Jin et al. ................ 359/872 |
| 2007/0144867 A1 | 6/2007 | Torashima et al. |
| 2007/0279720 A1 | 12/2007 | Torashima et al. |
| 2010/0172006 A1 | 7/2010 | Miyagawa et al. |

FOREIGN PATENT DOCUMENTS

| | | |
|---|---|---|
| JP | 2003-057586 | 2/2006 |

* cited by examiner

OSCILLATOR DEVICE AND OPTICAL DEFLECTOR USING THE SAME

TECHNICAL FIELD

This invention relates to an oscillator device having at least one movable element which is supported for oscillatory motion and an optical equipment using the same. The oscillator device can be applied as an optical deflector, an actuator or a sensor, for example. Furthermore, the optical deflector can preferably be used in a projection display unit for projecting an image by scanningly deflection of light or an image forming apparatus such as a laser beam printer or a digital copying machine having an electrophotographic process.

BACKGROUND ART

Optical scanning systems or optical scanning devices using an optical deflector including a movable element which performs sinusoidal wave vibration have conventionally been proposed. The optical scanning systems using an optical deflector which performs sinusoidal wave vibration have advantageous features, in comparison with optical scanning systems using a rotary polygonal mirror such as a polygon mirror, that: the optical deflector can be made very small in size; the power consumption is slow; and the optical deflector made of silicon monocrystal and produced by the semiconductor process has theoretically no metal fatigue and the durability is very good.

In optical deflectors using a resonance phenomenon, by exciting two or more natural oscillation modes in the torsional oscillation direction, optical scan other than the optical scanning of sinusoidal wave can be provided (see U.S. Pat. No. 7,271,943). FIG. 14 is a top plan view for explaining such optical deflector. A movable member (first movable element) 1001 of planar shape is supported by two torsion springs 1011a and 1011b at its top and bottom as viewed in the drawing, and it has a permanent magnet 1041. A movable member (second movable element) 1002 of a frame-like shape supports the torsion springs 1011a and 1011b at the inside thereof. It is supported by two torsion springs 1012a and 1012b at its top and bottom as viewed in the drawing. A supporting frame 1021 of frame-like shape supports the torsion springs 1012a and 1012b at the inside thereof. The supporting frame 1021 is bonded to a plate member 1000.

The movable members 1001 and 1002 and the torsion springs 1011 and 1012 have two natural oscillation modes, and the frequency ratio of them is in the relationship of approximately 1:2. By exciting these two modes at the same time, the optical deflector is driven by sawtooth wave oscillation, such that the optical scanning can be done with small drift of angular speed.

However, in the optical deflector of FIG. 14, no specific attention has been paid to the turbulence of airflow around the movable member when it is oscillated at a large oscillation angle.

On the other hand, as an optical deflector which can stabilize the oscillation angle of the movable element and the oscillatory motion thereof, there is an optical deflector such as shown in FIG. 15 which is an exploded view (see Japanese Laid-Open Patent Application No. 2003-057586). In FIG. 15, the optical deflector 1 comprises an oscillator 5, a base table 2 and a cover 20. The oscillator 5 includes a reflecting mirror (movable element) 8, torsion springs 9 and 10 coupled to the mirror, and a fixed frame member 7 to which the torsion springs 9 and 10 are coupled. The base table 2 includes supporting members 3 and 4, concaved portions 2a and 2b formed at the top surface between the supporting members 3 and 4, and electrodes 11 and 12 provided on the concaved portions 2a and 2b to oscillate the torsion spring 10. The cover 20 which covers the oscillator 5 is made of a material through which a light beam (not shown) to be deflected can be transmitted.

In such an optical deflector, when the reflecting mirror 8 oscillates and torsionally displaces, the stress produced at the connection point between the torsion springs 9 and 10 and the fixed frame member 7 can dispersed. Also, the stress can be dispersed to the torsion spring 10 as well without stress concentration only at the torsion spring 9. Thus, the torsion springs 9 and 10 need not be made too thick or too long. Thus, with a compact design, a comparatively large oscillation angle is provided while maintaining the resonance frequency of the reflecting mirror 8. Furthermore, by sealing the cover 20 and by thereafter filling it with a reduced pressure gas or inactive gas, any turbulence of the airflow can be reduced. In this way, the oscillatory motion of the oscillator can be stabilized.

In an electrophotographic apparatus such as a laser beam printer, an image is formed by scanning a photosensitive member surface with a laser beam. If an optical deflector such as shown in FIG. 14 is used in such apparatus and the scan is made with a large oscillation angle, no particular measures have been taken to reduce the turbulence of airflow or the like to thereby stabilize the oscillatory motion of the movable element. If such airflow turbulence occurs, it adversely affects the state of oscillation of the movable element, which may result in noise of oscillation or dispersion of oscillation (which are called "jitter"). Such jitter will directly deteriorate the scan precision.

On the other hand, in the case of the optical deflector shown in FIG. 15, turbulence of the airflow may be reduced by the reduced-pressure gas charging or inactive gas charging, and the oscillation angle and the oscillatory motion may be stabilized thereby. However, the packaging for the reduced-pressure gas charging or inactive gas charging will lead to an increased manufacturing cost. Furthermore, since the cover is made of a material through which the light beam to be scanningly deflected by the reflection mirror surface can be transmitted, the quantity of the light beam inevitably drops to some extent.

DISCLOSURE OF THE INVENTION

In accordance with an aspect of the present invention, there is provided an oscillator device, comprising: at least one movable element supported for oscillatory motion around a rotational axis; and a first rectifying member for suppressing generation of a spiral airflow during oscillation of said movable element; wherein said first rectifying member is provided to occupy a space of at least a portion of a spiral airflow generating region which might otherwise be created when said first rectifying member is not provided there.

In one preferred form of this aspect of the present invention, a reflection surface is formed on at least one movable element, wherein a driving device is provided to apply a torque to at least one movable element to drive the same.

The oscillator device may include a supporting member, a first movable element having a reflection surface, and at least one second movable element, wherein said first movable element and said second movable element may be supported by a torsion spring for torsional oscillation, relative to said supporting member, about a torsion axis corresponding to said rotational axis.

At least a pair of said first rectifying members may be disposed approximately symmetrically with respect to a plane which contains the rotational axis and which is perpendicular to a surface of said movable element as the same is at its stationary position.

A plurality of said first rectifying members having a tabular shape may be disposed in parallel to each other with a spacing interposed therebetween, so as to divide a spiral airflow in said spiral airflow generating region into plural spiral airflows.

When a largest oscillation angle of said movable element during oscillation is denoted by θmax, said first rectifying member may extend along a plane defined by extending the surface of said movable element as the same is at a position ±θmax, in a direction perpendicular to the rotational axis thereof.

When a largest oscillation angle of said movable element during oscillation is denoted by θmax, a shortest distance between said movable element as the same is at θmax and said first rectifying member is denoted by L1, and a shortest distance between said movable element as the same is at −θmax and said first rectifying member is denoted by L2, said first rectifying member may be provided to make L1 and L2 different from each other.

In the oscillator device, L1 may be made larger than L2, and L1 may have a size in a range not less than 100 μm and not greater than 250 μm.

The length of said first rectifying member in a direction of the rotational axis may be made larger than a length of said movable element in that direction.

The oscillator device may further comprise a second rectifying member having a surface parallel to or perpendicular to the surface of said movable element as the same is at its stationary position, wherein a shortest distance of said second rectifying member to said movable element may be made larger than a shortest distance between said movable element and said first rectifying member.

The oscillator device may further comprise a damper member for applying a damping function to the oscillatory motion of said movable element, wherein said damper member may be provided along at least a portion of a locus plane defined by an edge of said movable element during oscillation, so that the damping function is applied to the oscillatory motion of said movable element based on a viscosity of a fluid which is present between the edge of said movable element being oscillated and a portion of said damper member.

In accordance with another aspect of the present invention, there is provided an optical instrument, comprising: a light source; an optical deflector having an oscillator device as recited above; and a target member onto which light from said light source is to be incident; wherein said optical deflector is configured to deflect the light from said light source and to direct at least a portion of the light onto said target member.

In accordance with the present invention, since the first rectifying member is provided as mentioned above, generation of a spiral airflow is restrained and, even if the oscillation angle of the movable element is comparatively large, generation of the jitter is effectively controlled, and oscillatory motion of the movable element is stabilized. Thus, when the oscillator device of the present invention is used as an optical deflector, for example, since the light beam is not transmitted through the aforementioned cover member, stable optical scanning can be performed without decreasing the light quantity of the scanning light beam.

These and other objects, features and advantages of the present invention will become more apparent upon a consideration of the following description of the preferred embodiments of the present invention taken in conjunction with the accompanying drawings.

BEST MODE FOR PRACTICING THE INVENTION

Preferred embodiments of the present invention will now be described with reference to the attached drawings.

First Embodiment

Figure 1A:
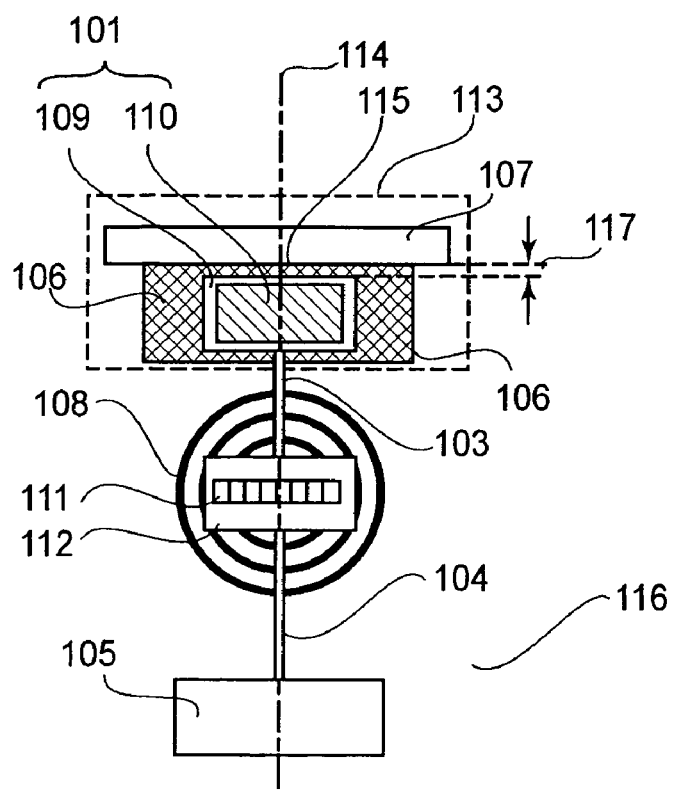
FIG. 1A is a front elevation for explaining an optical deflector according to a first embodiment of the present invention.

Referring to FIG. 1A to FIG. 5, an optical deflector according to a first embodiment of the oscillator device of the present invention will be explained. FIG. 1A is a front elevation of the optical deflector of the present embodiment. FIG. 1B is a plan view showing a region 113 in FIG. 1A. As shown in FIG. 1A, the optical deflector of the present embodiment comprises a first movable element 101, a second movable element 102, and two types of torsion springs 103 and 104 disposed along a straight line (torsional axis 114) connecting the two movable elements 101 and 102 in series. The first movable element 101 is supported by the first torsion spring 103. The second movable element 102 supports the first torsion spring 103, and it is supported by the second torsion spring 104. A supporting member 105 supports the second torsion spring 104. In this way, the tabular first movable element and second movable element are supported by the torsion springs for torsional oscillation around the same torsional axis 114 which is the rotational axis, relative to the supporting member 105. Here, θmax in FIG. 1B denotes the maximum oscillation angle of the oscillation of the movable element (this is also the case with FIG. 1C, FIG. 6, FIG. 7 and FIG. 8 to be described later).

A supporting base plate 116 supports the supporting member 105 and a damper member 107. The damper member 107 is bonded by an adhesive to the supporting base plate 116. The damper member 107 is provided along at least a portion of (in this example, the whole of) the locus plane as defined by an edge of the movable element being oscillated, at a side remote from the connection between the movable element 101 and the torsion spring 103. Since there is no necessity of forming a throughbore in the damper member through which the torsion spring or the like should extend, if the damper member is disposed at such position, the manufacture thereof is easier. The damper member is an element which is configured to apply a damping function to the oscillatory motion (resistance to the oscillatory motion) of the movable element 101 based on the viscosity of a fluid which is present during the oscillation between the edge of the movable element 101 and the portion of the damper member which is opposed to the edge of the movable element.

The first movable element 101 is comprised of a reflection surface 110 and a silicon member 109. The material of the reflection surface 110 is aluminum, for example. It can be formed by vacuum deposition. A protection film may be formed at the topmost surface of the reflection surface 110. The second movable element 102 is comprised of a silicon member 112 and two hard magnetic materials 111. The top and bottom surfaces of the silicon member 112 and the two hard magnetic materials 111 are bonded to each other by an adhesive. The hard magnetic materials 111 are a permanent magnet, for example.

Furthermore, there are a first rectifying member 106 and a second rectifying member 115 which are disposed in the vicinity of the first movable element 101. The first rectifying member 106 is bonded by an adhesive with the damper member 107 and the second rectifying member 115. The first rectifying member 106 functions to slow down the speed of the fast-flow spiral airflow (gas flow) (more specifically, it reduces generation of a spiral airflow during the oscillation of the movable element) to thereby stabilize the oscillatory motion of the first movable element 101. Here, the shortest distance between the first rectifying member 106 and the first movable element 101 during the oscillation (in the structure of FIG. 1B, it is the distance between the edge of the first movable element 101 waved to the maximum oscillation angle position and the free end of the first rectifying member 106) is 0.3 mm.

The first rectifying member 106 is a rectifying member which occupies the space of at least a portion of a spiral airflow generating region to thereby suppress generation of a spiral airflow in that region, wherein the spiral airflow generating region is a region where a spiral is easily generated if there is no such rectifying member. The rectifying member only needs to be present while occupying a certain space in the spiral airflow generating region adjacent the movable element. Thus, it is not always necessary that the rectifying member extends along an extension plane of the surface of the movable element 101, at its largest oscillation angle position, being extended in a direction orthogonal to the torsion axis 114, as illustrated in the diagram. For example, it may be a rod-like member or a mesh-shaped member occupying a certain space in the spiral airflow generating region adjacent the movable element, extending in a direction parallel to the torsion axis 114 and having a suitable cross-sectional shape such as a circle, for example. However, if it has a portion extending along the aforementioned extension plane as in the illustrated example, since it is able to guide the slowed-down airflow along the extension plane as a stable airflow, it is more preferable from the standpoint of stabilization of the oscillatory motion of the movable element.

Specifically, the present embodiment uses a pair of first rectifying members 106 which are disposed approximately symmetrically, with inverse tilts, with respect to a plane that contains the torsion axis 114 and is perpendicular to the reflection surface 110 of the movable element 101 as the same is in the stationary position. Furthermore, the first rectifying member 106 has such structure (wall structure) that plate-like members are disposed in parallel so as to divide the spiral airflow in the spiral airflow generating region into plural airflows (two in this example). Furthermore, the length of the first rectifying member 106 in the torsion axis 114 directions is made larger than the length of the movable element 101 in that direction. Namely, throughout the whole region of the spiral airflow generating region extending in that direction, the first rectifying member 106 is present to more assuredly suppress the spiral airflow in the spiral airflow generating region.

The second rectifying member 115 functions to turn the airflow having been slowed down by the first rectifying member 106 into a stable airflow, thereby to suppress the inflow of fresh gases which are necessary for the generation of fresh spirals. With this function, the oscillatory motion of the first movable element 101 is stabilized furthermore. In the example shown in FIG. 1B, the second rectifying member 115 has a surface parallel to the surface of the movable element 101 as the same is in the stationary position. Furthermore, the shortest distance with the movable element 101 is made larger than the shortest distance between the movable element 101 and the first rectifying member 106. The length of the second rectifying member 115 as well in the direction of the torsion axis 114 is made larger than the size of the movable element 101 in that direction.

Figure 1B:
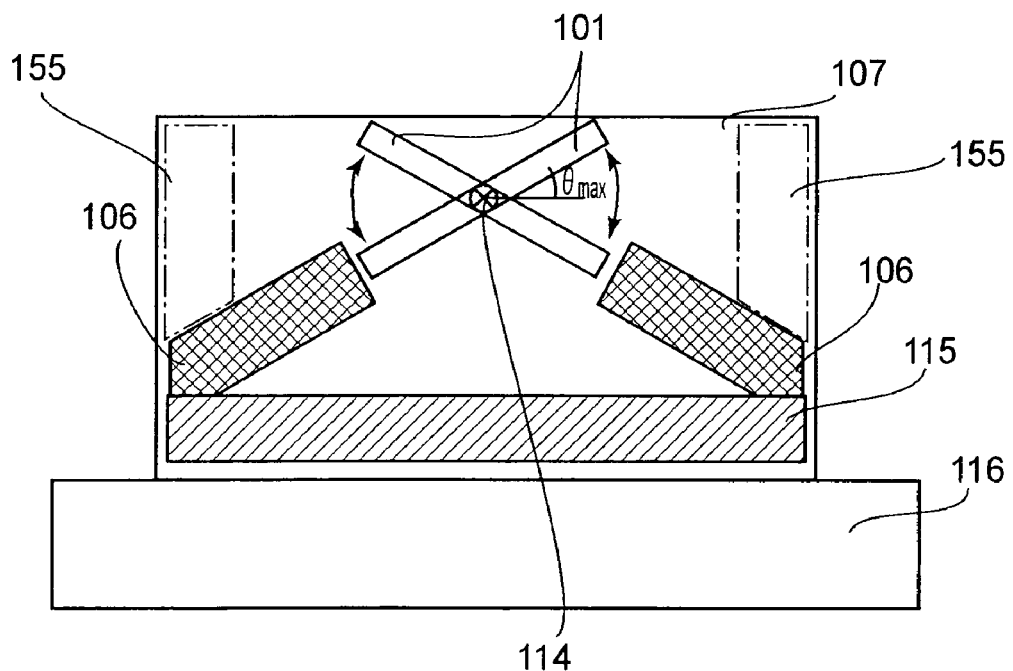
FIG. 1B is a plan view for explaining the optical deflector according to the first embodiment of the present invention.

In place of or in addition to the second rectifying member 115 shown in FIG. 1B, the second rectifying member may be disposed at a position depicted by a dash-and-dot line in FIG. 1B, in the manner shown at a reference numeral 155. Substantially the same advantageous results are obtainable with the second rectifying member 155 being provided as such.

A gap 117 illustrates the shortest distance of spacing as the surface of the damper member 107 is directly opposed to the edge of the first movable element 101 during the oscillation of the first movable element 101. In this example, the gap 117 is 0.1 mm. Due to the aforementioned damping effect which appears during the oscillation of the first movable element 101, unnecessary oscillation is relatively largely suppressed, and the oscillation of the first movable element 101 is stabilized. More specifically, due to the viscosity of the fluid which is present during the oscillation between the edge of the first movable element 101 and the damper surface which is a portion of the damper member 107 opposed to the edge portion, the damping function acts on the oscillatory motion of the first movable element 101. Here, although the oscillatory motion of the first movable element 101 is comprised of various kinetic components, approximately even suppressing force (damping function) acts on the whole of these components. Thus, unnecessary components such as relatively small jitter are suppressed relatively largely, relative to major components, such that substantially only desired and necessary oscillatory motion is left and the oscillatory motion is stabilized. Thus, it can be said that, in the present invention, the oscillatory motion is stabilized by intentionally applying, to the movable element, a resistance which disturbs the oscillation thereof.

The material of the first rectifying member 106, second rectifying member 115 and damper member 107 is resin, for example. These members may be formed integrally by die molding. It is suitable for mass production and enables cost reduction.

The silicon member 110 of the first movable element 101 has a length of 3 mm, for example, in the direction orthogonal to the torsion axis 114, and a length of 1 mm, for example, in the direction parallel to the torsion axis 114. The silicon member 112 of the second movable element 102 has a length of 3.0 mm, for example, in the direction orthogonal to the torsion axis 114, and a length of 1.5 mm, for example, in the direction parallel to the torsion axis. The supporting member 105, second torsion spring 104, silicon member 112 of the second movable element 102, first torsion spring 103, and silicon member 109 of the first movable element 101 can be formed integrally. For example, they can be formed integrally from a monocrystal silicon substrate based on photolithography and dry etching of the semiconductor production method. With such procedure, an optical deflector having high finishing precision and being small in size can be accomplished.

The permanent magnets which are hard magnetic materials 111 are adhesively bonded to both sides of the second movable element 102, respectively. Disposed blow this permanent magnet is an electric coil 108 which is provided on the supporting base plate 116 for supporting the supporting member 105 through a spacer (not shown). Here, a core (not shown) made of a high permeability material may be disposed in the clearance at the center of the electric coil 108. The base plate 116 and the electric coil 108 are adhesively bonded to each other. The permanent magnet which is a hard magnetic material 111 and the electric coil 108 constitute driving means. In response to an electric current applied to the electric coil 108, a torque acts on the hard magnetic material 111 on the second movable element 102 so that the whole oscillation system including a plurality of movable elements is driven.

The driving principle of the present embodiment will be explained. The optical deflector of the present embodiment can be treated as a two-degree-of-freedom oscillation system with respect to the torsional oscillation around the torsion axis 114, having a primary natural oscillation mode of a frequency $f_0$ which is the reference frequency and a secondary natural oscillation mode of a frequency twofold the reference frequency. The electric coil 108 of the driving means drives the optical deflector of the present embodiment, at two frequencies, that is, the frequency of the primary natural oscillation mode and the frequency two fold the reference frequency and having the same phase as the reference frequency.

Figure 2A:
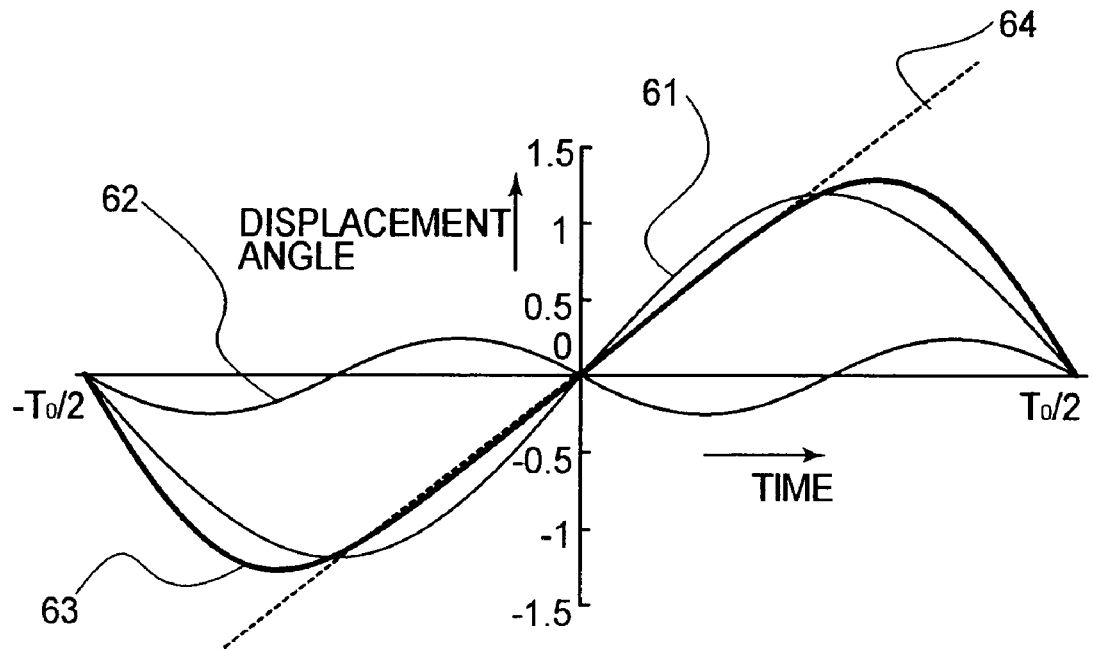
FIG. 2A is a graph illustrating the oscillation angle of a movable element of an optical deflector in an embodiment of the present invention.

FIG. 2A is a graph for explaining the oscillation angle of the torsional oscillation of the frequency $f_0$ of first movable element 101, while time t is taken on the axis of abscissas. Particularly, FIG. 2A illustrates the portion corresponding to a single period $T_0$ of the torsional oscillation of the first movable element 101 ($-T_0/2 < t < T_0/2$).

A curve 61 illustrates the component of the reference frequency $f_0$ among the oscillation based on the driving signal applied to the electric coil 108. It oscillates reciprocally within the range of the maximum amplitude $\pm\varnothing_1$. If time is t and the angular frequency is $w_0 = 2\pi f_0$, it is sinusoidal wave vibration that can be expressed by an equation below.

$$\theta_1 = \varnothing_1 \sin[w_0 t] \quad (1)$$

On the other hand, a curve 62 illustrates the frequency component which is twofold the reference frequency $f_0$. It oscillates within the range of the maximum amplitude $\pm\varnothing_2$ and it is sinusoidal wave vibration that can be presented by an equation (2) below.

$$\theta_2 = \varnothing_2 \sin[2w_0 t] \quad (2)$$

A curve 63 illustrates the oscillation angle of the torsional oscillation of the first movable element 101 caused as a result of such driving. As mentioned above, the oscillation system including the movable element can be treated as a two-degree-of-freedom oscillation system with respect to the torsional oscillation, and it has a natural oscillation mode of a reference frequency $f_0$ and a secondary natural oscillation mode of a frequency $2f_0$ with respect to the torsional oscillation around the torsion axis 114. Thus, in the optical deflector of the present embodiment, there occur resonances $\theta_1$ and $\theta_2$ excited by the driving signal as aforementioned. Namely, the oscillation angle of the first movable element 101 in the curve 63 corresponds to the oscillation based on superposing two sinusoidal wave vibrations, that is, a sawtooth-wave vibration which can be presented by equation (3) below.

$$\theta = \theta_1 + \theta_2 = \varnothing_1 \sin[w_0 t] + \varnothing_2 \sin[2w_0 t] \quad (3)$$

Figure 2B:
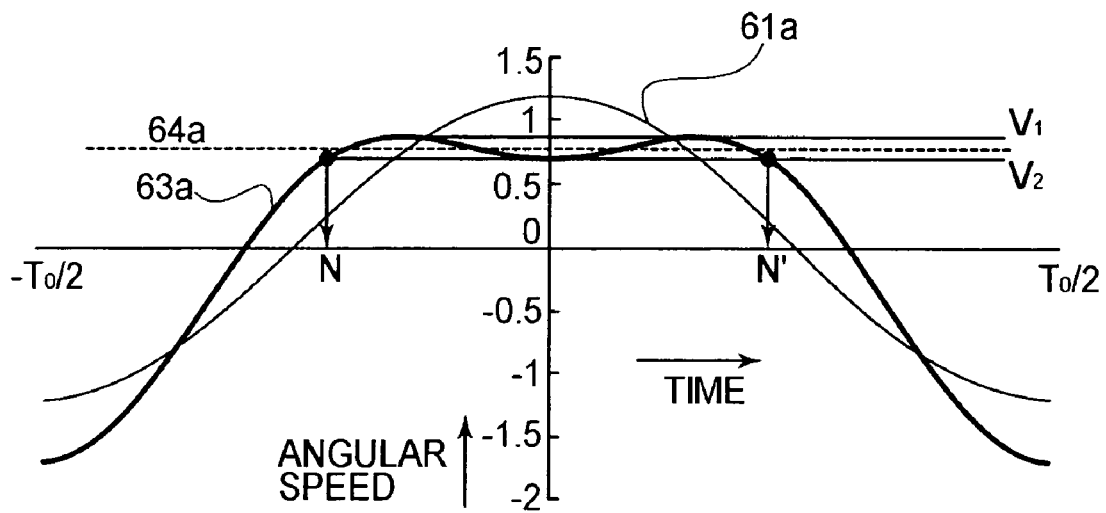
FIG. 2B is a graph illustrating the angular speed of a movable element of an optical deflector in an embodiment of the present invention.

FIG. 2B illustrates curves 61a and 63a and a straight line 64a which are obtained by differentiating the curves 61 and 63 and the straight line 64 of FIG. 2A, and it explains the angular speed of these curves. As compared with the curve 61a which is the angular speed of the sinusoidal wave vibration of the reference frequency $f_0$, the curve 63a illustrating the angular speed of the sawtooth-wave reciprocal oscillation of the movable element is as follows. Namely, in the section N-N', the angular speed fits in the range having a maximum and a minimum corresponding to the angular speed $V_1$ at the local maximum point and the angular speed $V_2$ at the local minimum point. Thus, in the application using the scanning deflection of the light by the optical deflector of the present embodiment, if $V_1$ and $V_2$ are present within the allowable error range of the angular speed from the straight line 64a which means the constant angular-speed scan, the section N-N' can be regarded as being a substantially constant angular scan range. In regard to the angular speed of scanning deflection, as described above, the substantially constant angular-speed region can be widened by the sawtooth-wave reciprocal oscillation, as compared with a case where the oscillation angle is a sinusoidal wave. Thus, the available region relative the whole region of scanning deflection can be enlarged.

In the foregoing description, a case where two natural oscillation modes have frequencies of approximately twofold relationship has been explained. If the relationship is approximately threefold, the shape of superposed oscillatory motion will be approximately chopping wave. In that occasion, since the approximately constant angular-speed region appears in the forward stroke and the backward stroke during the reciprocal scanning deflection, it is particularly suitable for those applications in which the constant angular speed is used in the forward and backward strokes of the reciprocation.

Where the driving such as mentioned above is to be carried out, the plurality of natural oscillation modes should be adjusted in a desired relationship and the oscillation angle as well as the oscillatory motion should be stabilized. In the optical deflector of this embodiment, the inertia moment $I_2$ of the second movable element 102 is made larger than the inertia moment $I_1$ of the first movable element 101, with regard to the torsion axis 114, by which the two natural oscillation frequencies can be adjusted in a desired relationship quite easily.

For example, where the inertia moments of the first and second movable elements are in the relationship of $I_1 > I_2$, if the inertia moment $I_1$ is changed, then both of the two natural oscillation frequencies change greatly. Furthermore, even if the inertia moment $I_2$ is changed, both of the two natural oscillation frequencies change greatly. Therefore, the two natural oscillation frequencies of torsional oscillation cannot be adjusted individually and sufficiently. On the other hand, where the inertia moments of the first and second movable elements are in the relationship of $I_1 < I_2$, if the inertia moment $I_1$ or $I_2$ is changed, either the primary natural oscillation mode or the secondary natural oscillation mode can be mainly changed. Preferably, $I_2$ had better be quadruple or more of $I_1$.

Hence, if the two natural oscillation modes are not in a desired relationship with each other due to the dispersion in shape during the manufacture of the optical deflector, for example, the two natural oscillation modes of torsion can be adjusted in a desired frequency relationship by adjusting the inertia moment $I_1$ or $I_2$.

Furthermore, the amplitude amplification factor (resonance sharpness Q-value) of the natural oscillation mode can be improved by enlarging the inertia moment $I_2$. By enlarging the inertia moment to make the amplitude amplification factor larger and by controlling dispersion of the vibrational energy, the stability of the oscillation angle and oscillatory motion can be improved.

Figure 3:
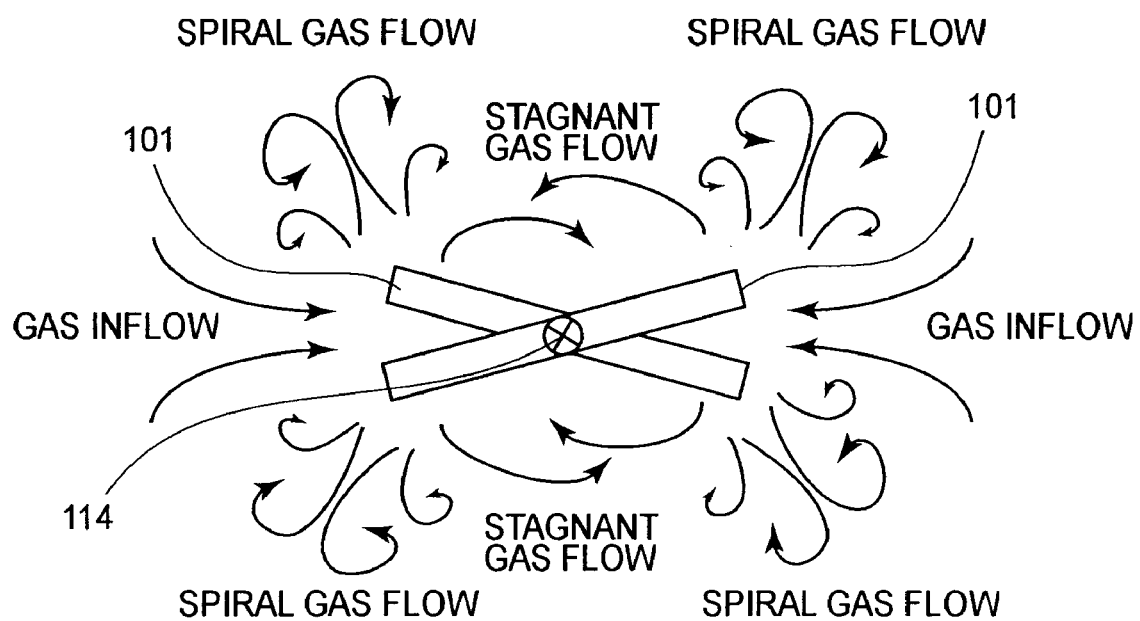
FIG. 3 is a schematic diagram for explaining a spiral airflow generating region where a spiral airflow is generated.

The Spiral airflow will be explained furthermore. FIG. 3 shows an optical deflector in a case where nothing is disposed adjacent the first movable element 101 in the oscillation, in the optical deflector shown in FIG. 1A. Also, FIG. 3 is a diagram schematically illustrating the state of airflows in the oscillation, as measured by fluid measurement in the section along a plane which passes through the first movable element 101 and which is perpendicular to the torsion axis 114. In FIG. 3, gases flow in from adjacent the opposite ends of the first movable element 101 (adjacent the lateral edges as viewed in FIG. 3) as the same is at zero oscillation angle (0 deg.), i.e., at its stationary position. Then, spiral airflows are produced from adjacent the opposite ends of the first movable element 101 as the same is at the maximum oscillation angle. Also, stagnant airflows are produced around the torsion axis 114. The spiral airflow is fast in speed and it is unstable. Thus, it makes the oscillatory motion of the movable element unstable.

Figure 4:
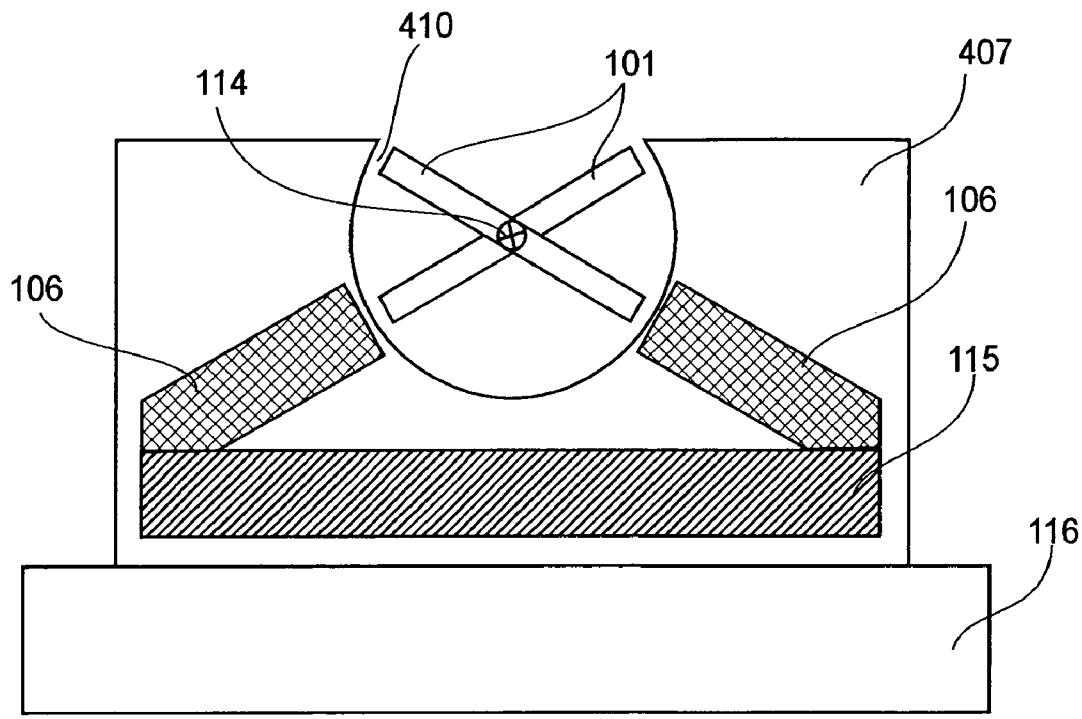
FIG. 4 is a plan view for explaining the effect of a rectifying member in an oscillator device of the present invention.

FIG. 4 shows an optical deflector in which a first rectifying member 106 and a second rectifying member 115 are provided adjacent the first movable element 101 of the optical deflector shown in FIG. 3. The positional relationship among the first movable element 101, first rectifying member 106 and second rectifying member 115 is similar to that of the optical deflector shown in FIG. 1A. A rectifying-member fixing member 407 fixedly holds the first rectifying member 106 and the second rectifying member 115. In this example, the rectifying-member fixing member 407 does not have a function as a damper member. Thus, there is an opening 410 formed adjacent the locus plane defined by the edge of the first movable element 101, which is perpendicular to the torsion axis 114. A supporting base plate 116 fixedly holds the rectifying-member fixing member 407.

In the structure shown in FIG. 3 and FIG. 4, the stability of the oscillation angle or oscillatory motion of the first movable element 101 was actually measured. The results are as follows.

Figure 5:
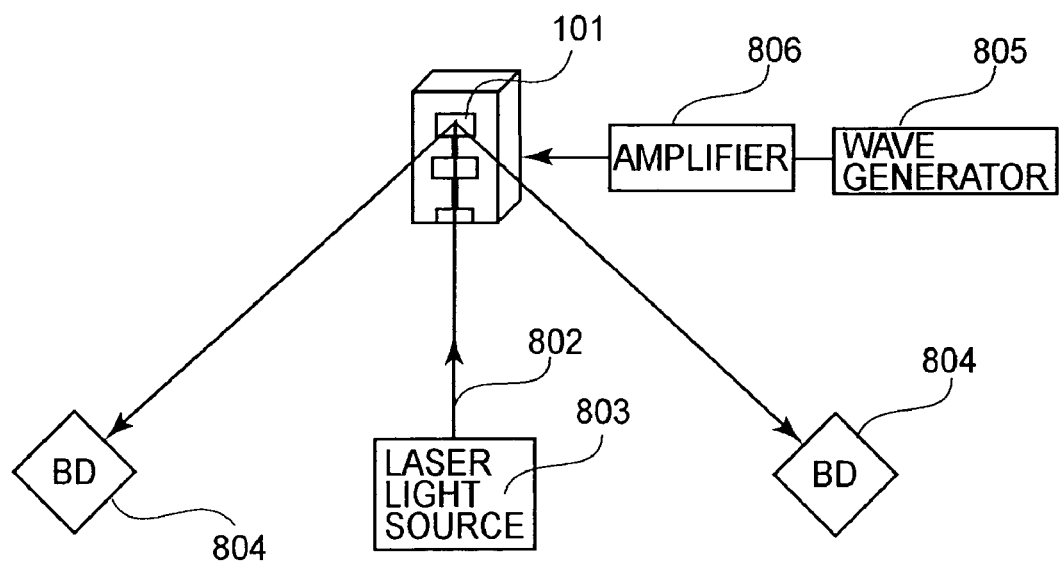
FIG. 5 is a diagram of an experiment system used to clarify the effect of the optical deflector of an embodiment of the present invention.

FIG. 5 shows an experiment system for measuring the stability of the oscillation angle of the movable element 101. A sinusoidal wave generated by a wave generator 805 is amplified by an amplifier 806 and, by applying an alternating current to the coil (not shown), the first movable element 101 is oscillated (maximum oscillation angle 38 deg.). A light ray 802 emitted from a light source 803 is reflected by the first movable element 801 which is being oscillated, and the reflected light ray is received by two beam detectors (BD) 804. The two beam detectors 804 are respectively disposed at positions where the light beam reaches when oscillation angle becomes ±30 deg., respectively, and for every scan, the light receiving time interval between these beam detectors 804 is measured by means of a time interval analyzer (not shown). From the scan unevenness as determined by the light receiving time interval between the beam detectors BD for every scan as measured as described above, the stability of the oscillation angle of the first movable element 101 is evaluated. The scan unevenness can be represented by the mean of peak-to-peak values of the light receiving time interval.

The measurement results of the scan unevenness were such that, as compared with the optical deflector of FIG. 3, the unevenness in the optical deflector of FIG. 4 was reduced by 55%. Furthermore, the difference of the driving current value at that time was around a few percentages. Namely, it can be said that the factor that caused reduction of scan unevenness is not the increased air resistance by the first rectifying member 106 and the second rectifying member 115, but the suppression or reduction of spiral airflow. Hence, the effect of reducing the scan unevenness by the suppression of the spiral airflow has been conformed even by experiments.

Here, the stability of the oscillation angle can be improved even by making the length of the second movable element 102 in a direction perpendicular to the torsion axis 114 longer than the length of the first movable element 101 in a direction perpendicular to the torsion axis 114. Furthermore, the stability of the oscillation angle can be improved even by making the length of the second movable element 102 in a direction parallel to the torsion axis 114 longer than the length of the first movable element 101 in a direction parallel to the torsion axis 114. Therefore, regardless of the direction in which the second movable element 102 is elongated, the stability of the oscillation angle can be improved. Also, here, it is easy to make the inertia moment $I_2$ larger than the inertia moment $I_1$.

Furthermore, in the optical deflector of the present embodiment, the first movable element 101 is supported in a cantilever fashion, and the supporting member 105, one first torsion spring 103 and one second torsion spring 104 are coupled with each other. Thus, even if an unnecessary force is applied to the supporting member 105 due to a stress as the same is fixed or a thermal stress and deformation occurs at the fixing position with the supporting member 105, substantially no stress will be applied to the first movable element 101 and the second movable element 102. Thus, degradation of the flatness (profile irregularity) of the reflection surface of the first movable element 101 can be prevented.

In the optical deflector of the present embodiment, the second movable element 102 is comprised of a plurality of members (silicon member 112 and hard magnetic material 111). On the other hand, the first movable element 101 having a reflection surface 110 is formed from a single member.

Thus, even if the second movable element 102 is deformed as the hard magnetic material 111 is adhered to and fixed to the silicon member 112, the reflection surface 110 on the first movable element 101 is not deformed. Therefore, deterioration of the scanning spot can be avoided assuredly.

Figure 1C:
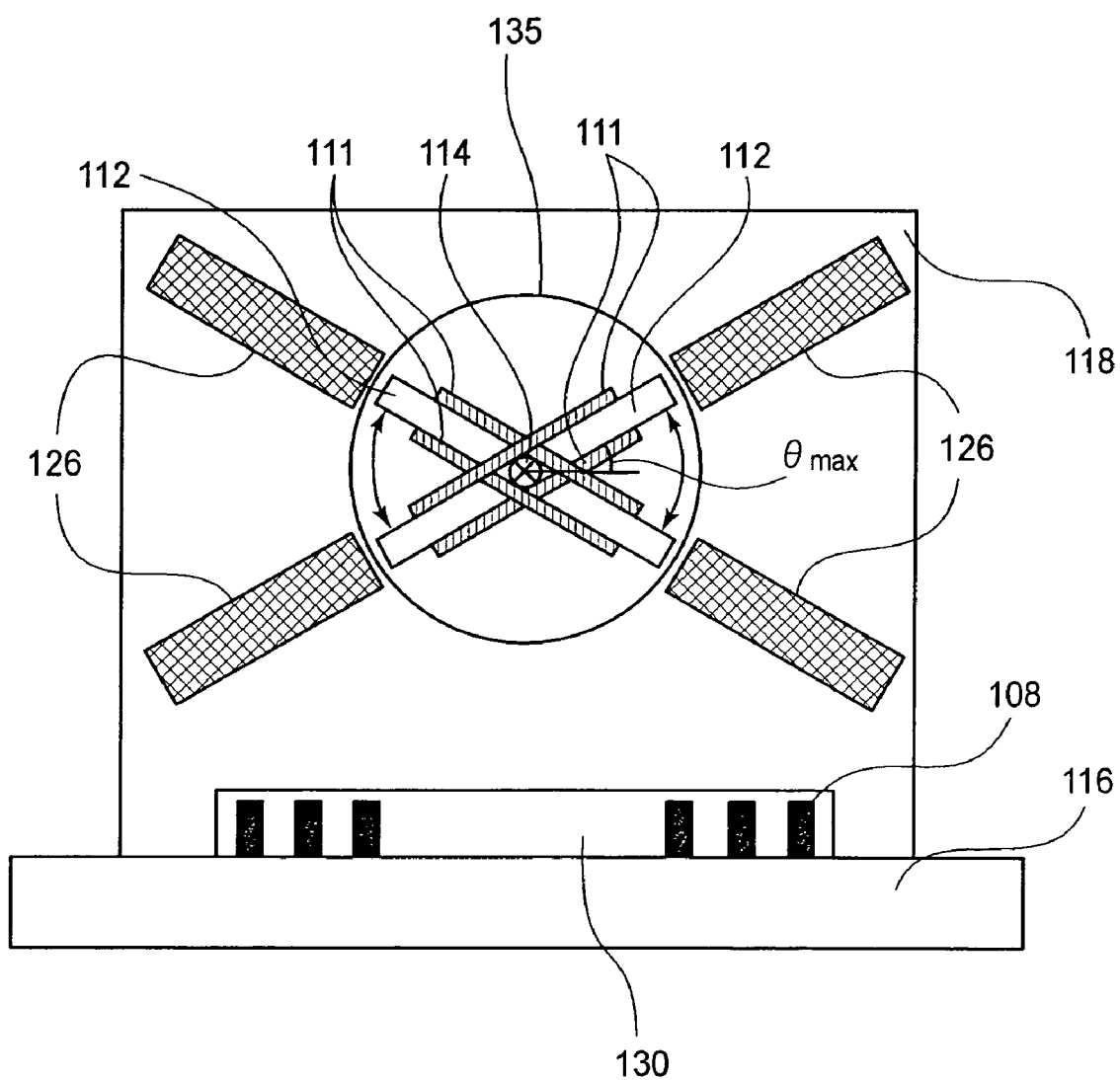
FIG. 1C is a plan view for explaining a modified example of the optical deflector according to the first embodiment of the present invention.

The above-described structure may be modified such as shown in FIG. 1C. In the optical deflector of the modified example of FIG. 1C, there are two pairs of first rectifying members 126 disposed adjacent the second 102 movable element. Namely, this is an example wherein, in place of or in addition to the one pair of first rectifying members 106 mentioned hereinbefore, at least two pairs of first rectifying members 126 are disposed approximately symmetrically with respect to a plane which contains the torsion axis 114 and which is parallel to the surface of the second movable element 102 at its stationary position. FIG. 1C is a plan view of a portion around the second movable element 102 in that case. In FIG. 1C, the first rectifying member 126 is bonded by an adhesive to a rectifying-member fixing member 118. The rectifying-member fixing member 118 is bonded by an adhesive to a supporting base plate 116. The material of the rectifying-member fixing member 118 and the supporting base plate 116 is resin, for example. They may be integrally molded by die molding. By disposing the first rectifying member 126 also in the vicinity of the second movable element 102, the oscillatory motion of the second movable element 102 can be stabilized. As a result of this, the oscillatory motion of the first movable element 101 as well can be stabilized furthermore. In this structure, the damper member 107 may be omitted together with the one pair of first rectifying members 106.

In FIG. 1C, denoted at 130 is an aperture formed in the rectifying-member fixing member 118 through which the electric coil 108 extends. Denoted at 135 is a circular throughbore formed in the rectifying-member fixing member 118 through which the torsion spring passes.

In accordance with the present embodiment, since the first rectifying members are provided as described above, generation of spiral airflows adjacent the movable element is suppressed. Therefore, even if the oscillation angle of the movable element is comparatively large, the oscillatory motion of the movable element is stabilized. Thus, when an optical deflector of the present embodiment is used, stable optical scanning can be performed without decreasing the light quantity of scanning light beam.

Second Embodiment

Figure 6A:
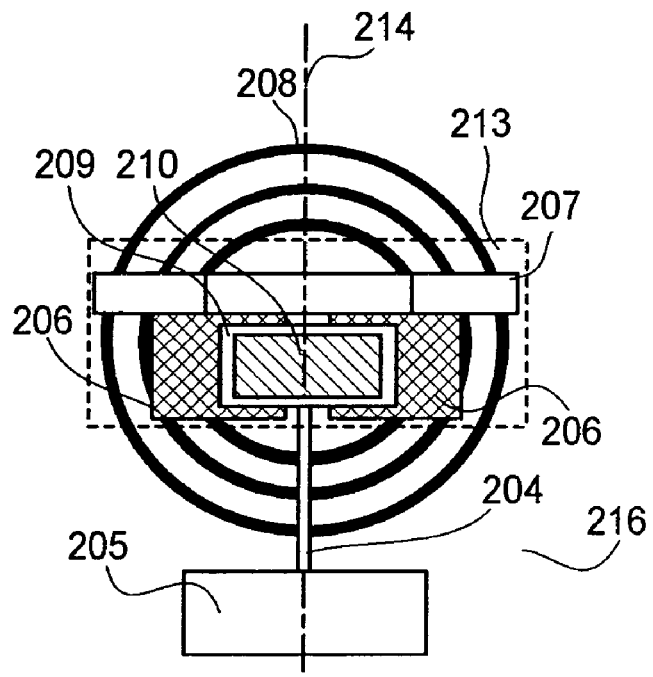
FIG. 6A is a front elevation for explaining an optical deflector according to a second embodiment of the present invention.
Figure 6B:
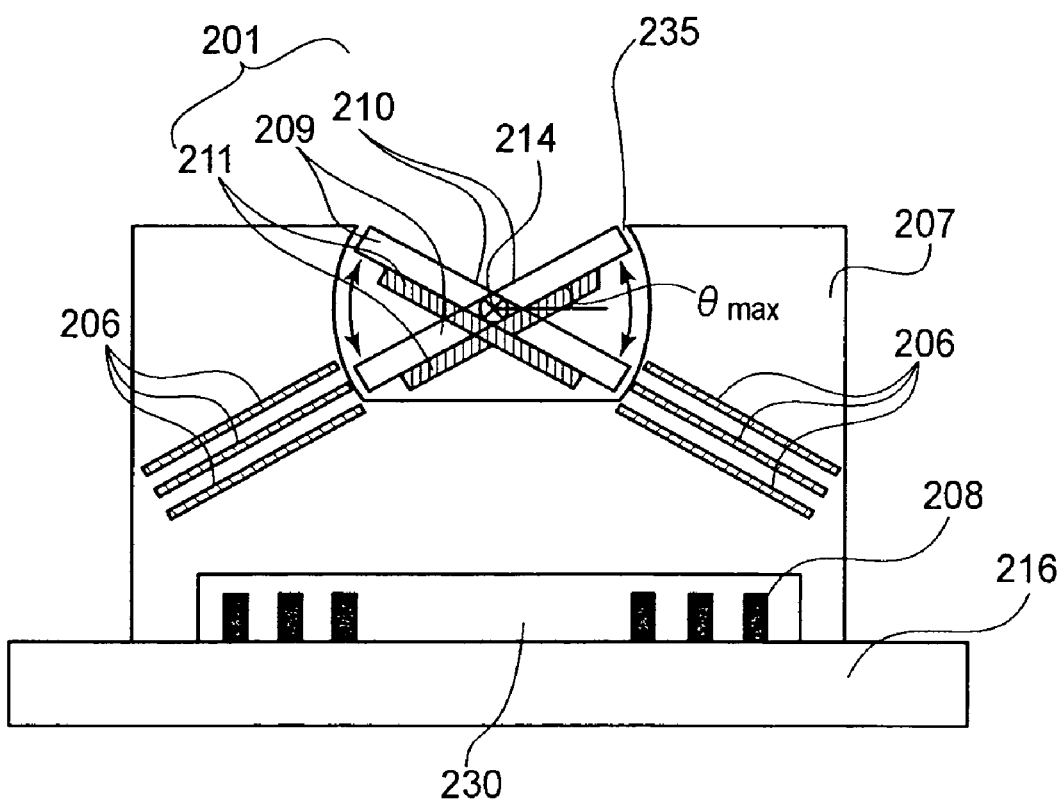
FIG. 6B is a plan view for explaining the optical deflector according to the second embodiment of the present invention.

FIG. 6A is a front elevation of an optical deflector according to a second embodiment of the present invention. FIG. 6B is a plan view of a region 213 of FIG. 6A. In this embodiment, as shown in FIGS. 6A and 6B, one movable element 201 is supported by one torsion spring 203, and a supporting member 205 supports the torsion spring 204. A supporting base plate 216 supports the supporting member 205 and a rectifying-member fixing member 207.

The movable element 201 is comprised of a reflection surface 210, a silicon member 209 and a hard magnetic material 211. The material of the reflection surface 210 provided on the top surface of the silicon member 209 is aluminum, for example. It is formed there by vacuum deposition. A protection film may be formed on the topmost surface of the reflection surface 210. The hard magnetic material 211 is a permanent magnet, for example. It is bonded by an adhesive to the bottom surface of the silicon member 209.

Specifically, there are two sets of first rectifying members 206, each set including three plate-like first rectifying members having a wall structure extending in parallel to the torsion axis 214 direction. As illustrated in the diagram, these two sets of first rectifying members 206 are disposed approximately symmetrically, with inverse tilts, with respect to a plane which contains the torsion axis 214 and which is perpendicular to the reflection surface 210 at its stationary position. These total six first rectifying members 206 are bonded by an adhesive to the rectifying-member fixing member 207. The rectifying-member fixing member 207 is bonded by an adhesive to the supporting base plate 216. The material of the first rectifying members 206 and the rectifying-member fixing member 207 is resin, for example. They may molded integrally by die molding. In this way, the optical deflector is provided with a structure (wall structure) that a plurality of tabular first rectifying members 206 are disposed in parallel with a predetermined spacing interposed therebetween, so as to divide the spiral airflow in the spiral airflow generating region into plural airflows.

In the present embodiment, the rectifying-member fixing member 207 does not have a function as damper member. Thus, there is an opening 235 formed adjacent the locus plane defined by the edge of the first movable element 201, which is perpendicular to the torsion axis 214. In FIG. 6B, denoted at 230 is an aperture formed in the rectifying-member fixing member 207 through which the electric coil 208 extends.

Here, the airflow from the suppressed spiral airflow is guided through between the rectifying members 206 and directed outwardly, effectively. Thus, stagnation of the airflow in the vicinity of the movable element 201 is prevented, and the oscillatory motion of the movable element 201 is stabilized. Furthermore, the shortest distance between the first rectifying member 206 and the movable element 201 during the oscillation is 0.3 mm as in the preceding embodiment, and the assembling is easy. Furthermore, even if external impact or vibration is applied when the movable element 201 is at its stationary position, since the movable element 201 and the first rectifying member 206 are spaced apart from each other by a sufficient distance, they do not contact with each other.

In the optical deflector of the present embodiment, only the movable element 201 having a reflection surface 210 oscillates. Thus, turbulence of the airflow due to the oscillation of the movable element is minimized and the oscillatory motion of the movable element 201 can be stabilized. The driving means comprising an electric coil 208 and a hard magnetic material 211 as well as the remaining points are similar to those of the first embodiment. It is to be noted that the number of tabular first rectifying members 206 of wall structure, constituting each set, is not limited to three. It may be two or 4 or more.

Third Embodiment

Figure 7:
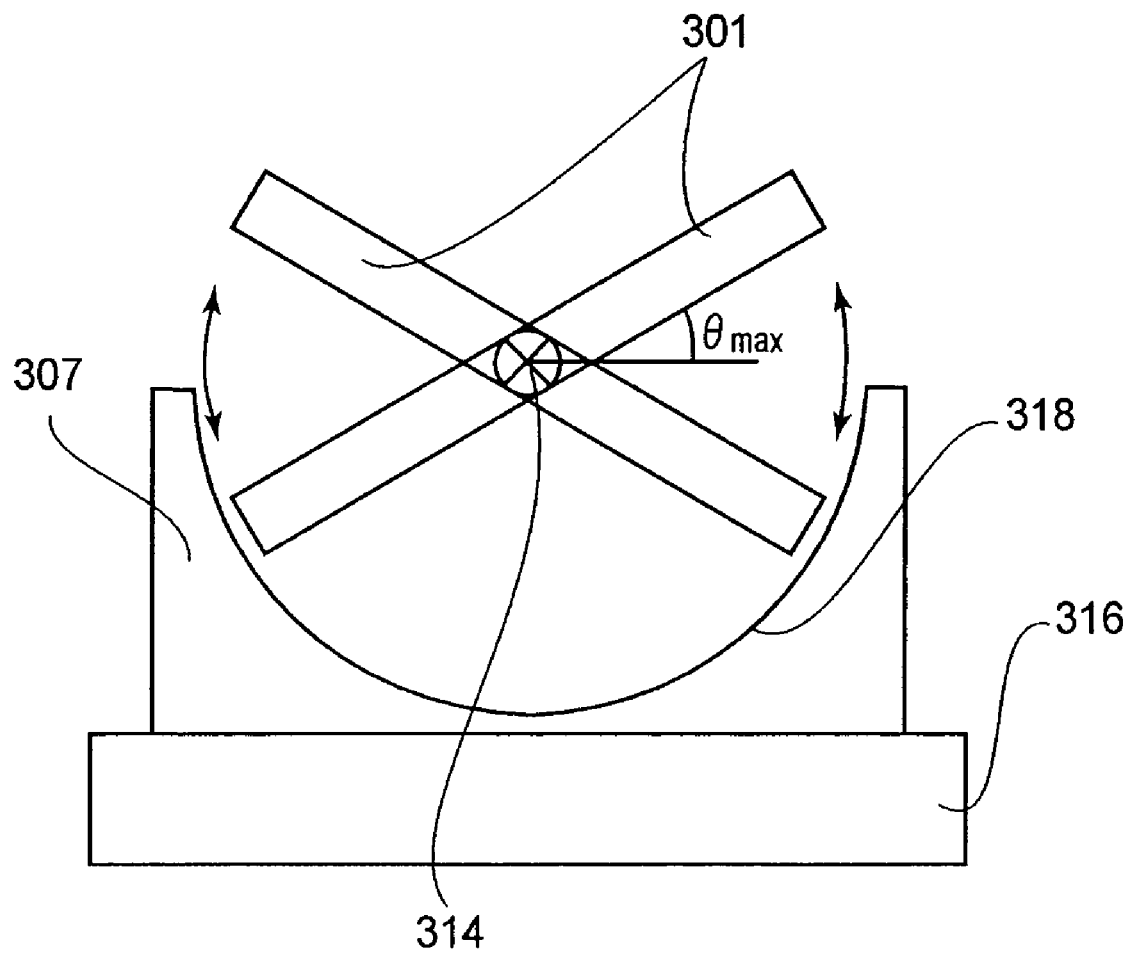
FIG. 7 is a plan view for explaining an optical deflector according to a third embodiment of the present invention.

An optical deflector according to a third embodiment of the oscillator device of the present invention will be explained. As shown in FIG. 7 which is a view seen from the direction of the torsion axis 314, in the optical deflector of the present embodiment, there is a member 307 which functions as a first rectifying member and also as a damper member. The member 307 is provided along a curved locus plane which is defined by the edge of the movable element 301 during the oscillation, the edge being parallel to the torsion axis 314. The surface depicted at 318 is a damper surface and, yet, the portion thereof adjacent the spiral airflow generating region functions as a rectifying member.

The member 307 is fixed to a supporting base plate 316. FIG. 7 is a sectional view along a plane perpendicular to the torsion axis 314 which is the rotational axis of the movable element 301. The other structures of the present embodiment are similar to the optical deflector of the first embodiment or of the second embodiment. As described above, the curved surface 1318 is disposed opposed to the edge of the movable element 301 which is most spaced apart from the torsion axis 314 and which is the fastest-speed portion of the movable element, with a gap interposed therebetween. With this arrangement, the damping effect is enhanced furthermore.

In the example of FIG. 7, although the surface 318 extends only up to the middle of the curved locus plane defined by the edge of the movable element 301, the damper surface may be extended furthermore so as to cover the whole curved locus plane and the whole spiral airflow generating region (see FIG. 3). Furthermore, it may be extended by 360 degrees around the torsion axis 314 to form a tubular shape. The spiral airflow suppressing effect and the damping effect can be strengthened by such arrangement. With regard to the degree extending the surface 318, it can be designed appropriately in accordance with the requirements.

Fourth Embodiment

Figure 14:
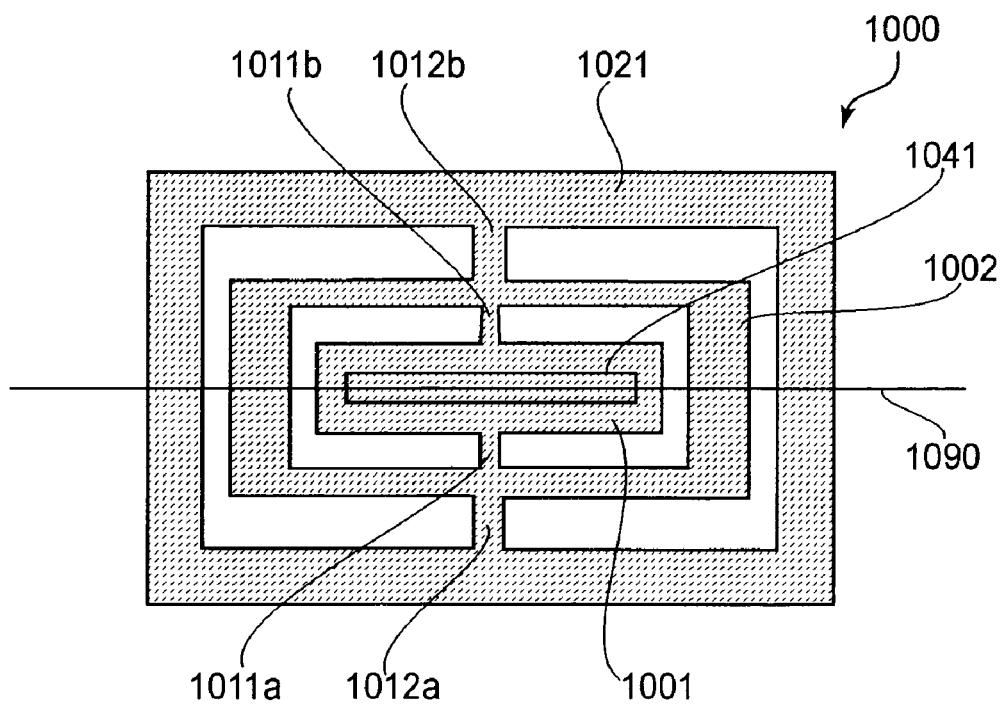
FIG. 14 is a top plan view for explaining a conventional optical deflector.
Figure 15:
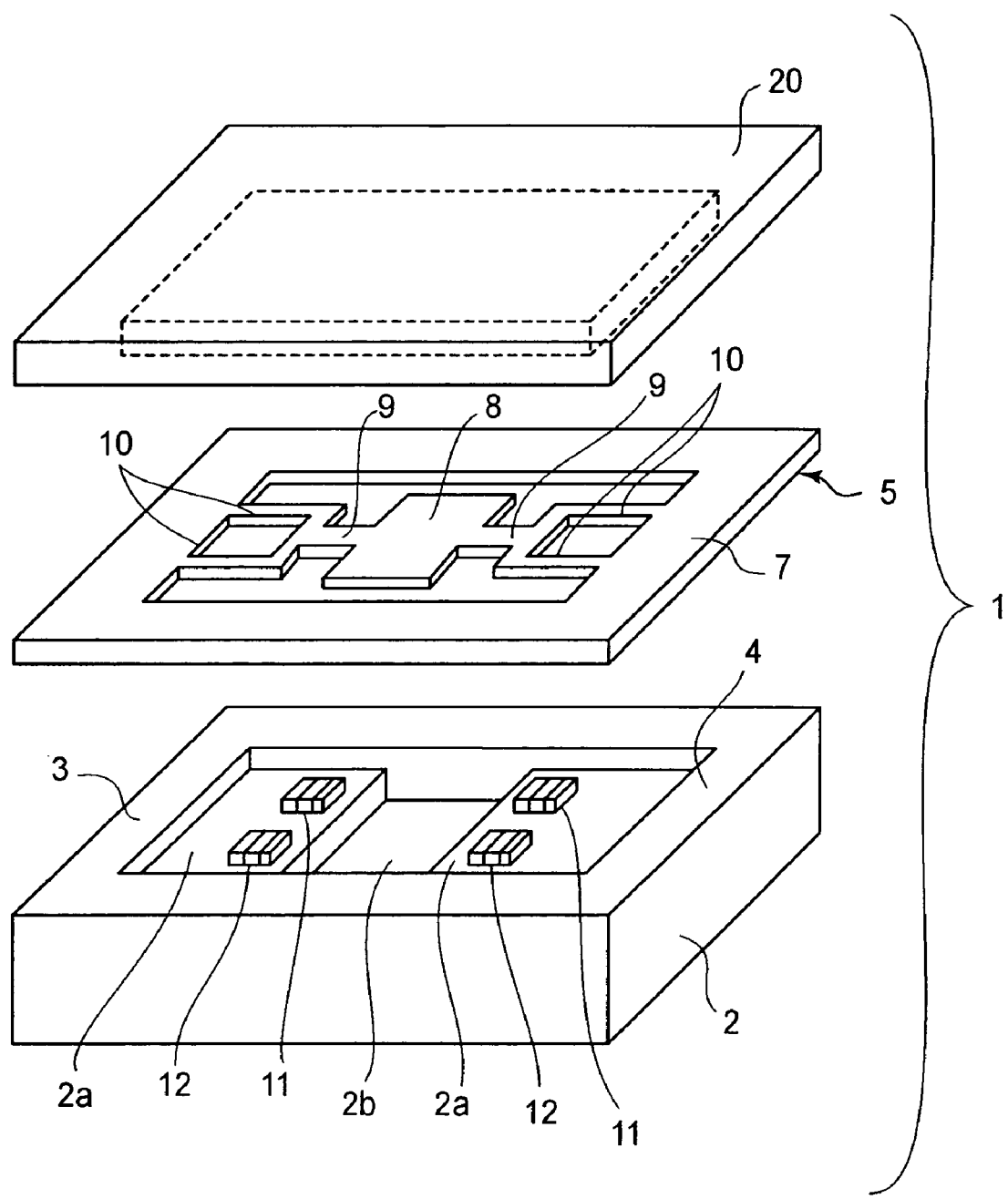
FIG. 15 is a perspective view for explaining a conventional optical deflector.

The rectifying member can be provided in an oscillator device such as shown in FIG. 14 having been described with reference to the introductory portion of the specification, concerning the background art. In that occasion, as an example, at least one of a movable member (first movable element) 1001 supported at its opposite ends and a movable member (second movable element) 1002 may be provided with a first rectifying member such as explained with reference to the preceding embodiment. The movable member 1001 may be supported for oscillatory motion, in a cantilever fashion, by use of one torsion spring and through the movable member 1002 of frame-like shape. Furthermore, the movable member (second movable element) 1002 may be bisected to provide a structure supported at its opposite ends, in which a first movable element, a second movable element and a torsion spring are coupled with each other in series. Furthermore, the torsion spring of the movable member (first movable element) 1001 and the torsion spring of the movable member (second movable element) 1002 may be formed to extend in directions intersecting each other (e.g., orthogonal directions) so that the movable members 1001 and 1002 may oscillate around different rotational axes. The first rectifying member can be provided in such structure, as has been explained with reference to the preceding embodiments.

In the manner described above, an optical deflector having a reflection surface formed on one movable element and driving means for applying a torque to at least one movable element, is accomplished. As a matter of course, if the oscillator device is used to provide a sensor, the driving means may be omitted as required.

Fifth Embodiment

Figure 8A:
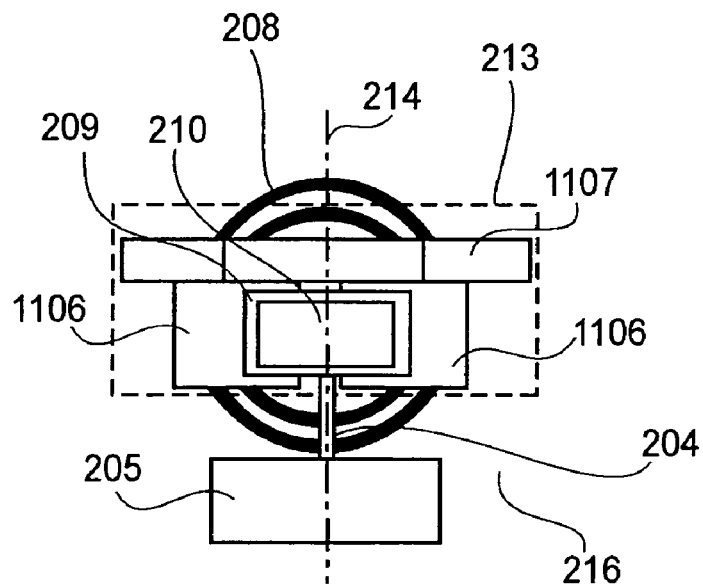
FIG. 8A is a front elevation for explaining an optical deflector according to a fifth embodiment of the present invention.
Figure 8B:
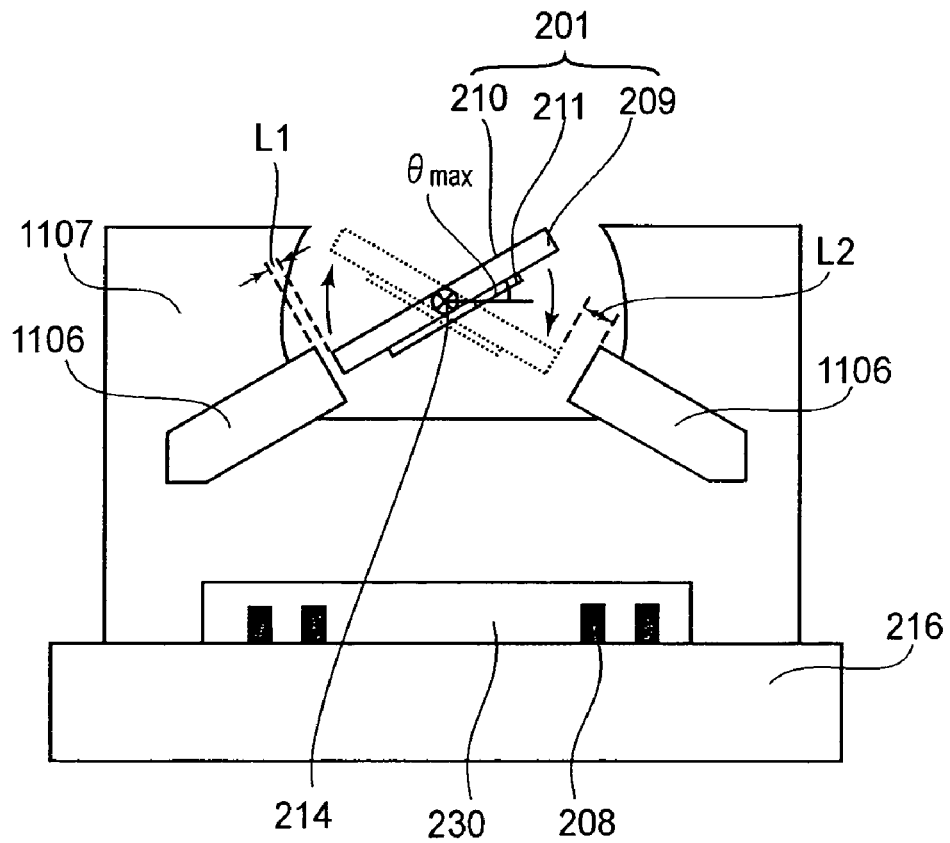
FIG. 8B is a plan view for explaining the optical deflector of the fifth embodiment of the present invention.

An optical deflector according to a fifth embodiment of the oscillator device of the present invention will be explained. FIG. 8A is a front elevation illustrating an optical deflector of the present embodiment. FIG. 8B is a plan view of a region 213. In FIGS. 8A and 8B, a movable element 201 which is comprised of a reflection surface 210, a silicon member 209 and a hard magnetic material 211 as well as a torsion spring 204, a supporting member 205, a supporting base plate 216, a torsion axis 214, and an electric coil 208 are the same as those of the optical deflector of FIG. 6 in the second embodiment.

In the present embodiment as well, a rectifying-member fixing member 1107 is supported by a supporting base plate 216. Furthermore, the rectifying-member fixing member 1107 supports a pair of first rectifying members 1106. On the other hand, if the maximum oscillation angle of the movable element 201 in the oscillation is denoted by θmax, the shortest distance GAP1 between the movable element 201 as the same is at θmax and the first rectifying member 1106 is denoted by L1, and the shortest distance GAP2 between the movable element 201 as the same is at −θmax and the first rectifying member 1106 as denoted by L2, then L1 and L2 are made different from each other. Namely, the first rectifying member 1106 is disposed slightly asymmetrically so as to satisfy such positional relationship. This is to assure that: the scanning light during the oscillation of the movable element 201 from θmax to −θmax is used, while on the other hand the scanning light during the oscillation of the movable element 201 from −θmax to θmax is not used (or the irradiation of light may be stopped to interrupt the scan); and that, although the stability of change of the oscillation angle of the movable element 201 in the latter might be sacrificed to some extent, the stability of change of the oscillation angle of the movable element 201 in the former which is the one to be used should be enhanced furthermore. In other words, this is to ensure that the oscillation angle is assuredly stable during the use of scanning light, although instability of the same during non-use of the scanning light (the movable element is still oscillating) to some extent is allowed. With this arrangement, the stability during the use of the scanning light can be enhanced furthermore.

More preferably, L2 should be larger than L1, and L1 should be set in the range of not less than 100 μm and not greater than 250 μm.

Experiments were made to clarify the advantageous effects of the setting described above. An experiment system for an optical deflector and its scan unevenness shown in FIGS. 9A and 9B as well as the experiments and the results thereof will be described below. Here, although the optical deflector shown in FIGS. 9A and 9B has a similar structure as of the first embodiment, not of the second embodiment, the experimental results similarly apply to the optical deflector of the first embodiment and the optical deflector of the second embodiment.

Figure 9A:
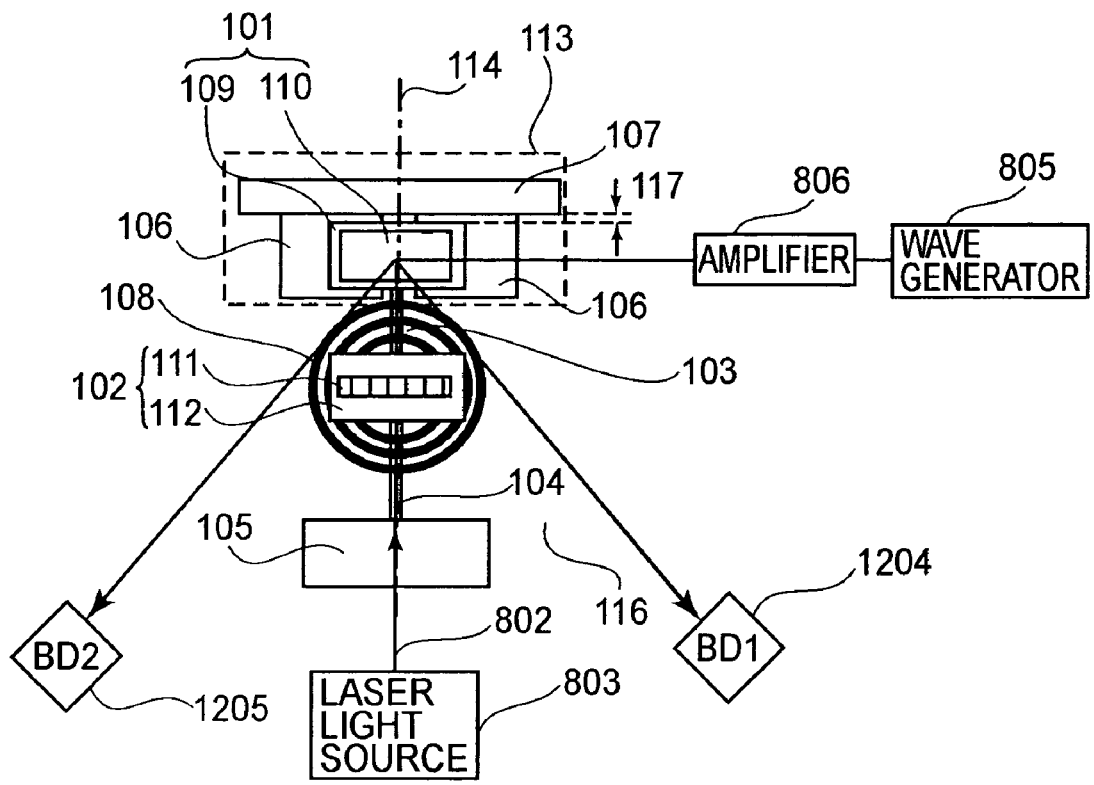
FIG. 9A and FIG. 9B are diagrams of another experiment system used to clarify the effect of an optical deflector of an embodiment of the present invention.
Figure 9B:
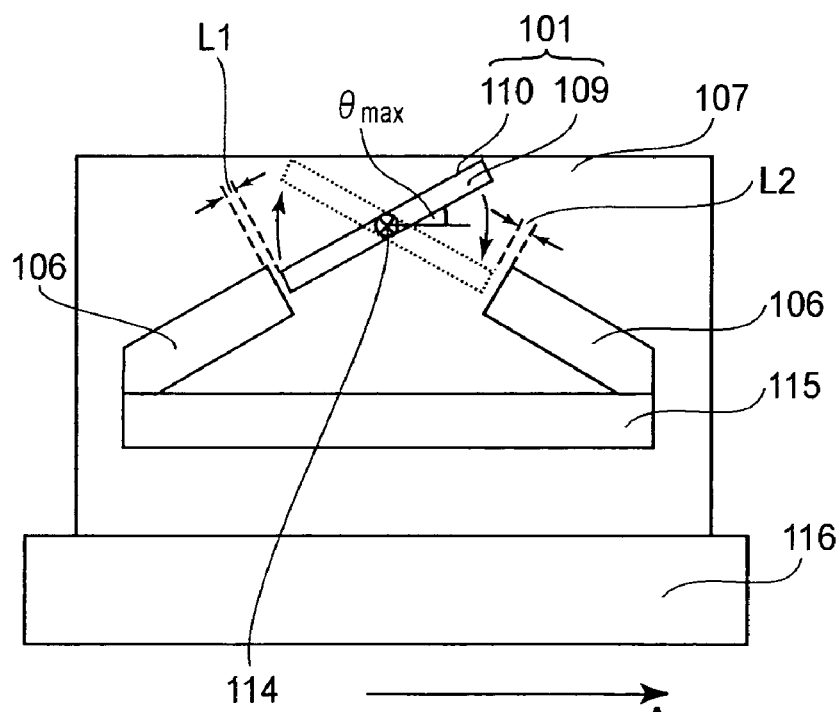

First of all, FIG. 9A is a schematic diagram of the structure in which an experiment system for measuring scan unevenness is added to the optical deflector, to clarify the advantageous effects of the aforementioned setting. FIG. 9B is a plan view of a region 113 in FIG. 9A. As described above, the optical deflector shown in FIG. 9 is the same as the optical deflector of FIG. 1A. However, initially, L1 and L2 are set to 0.25 mm (250 μm).

The experimental system has the following structure. In FIG. 9B, a sinusoidal wave generated by a wave generator 805 is amplified by an amplifier 806 and, by applying an alternating current to an electric coil 108, the first movable element 101 is oscillated (maximum oscillation angle 38 deg.). A light ray 802 emitted from a light source 803 is reflected by the first movable element 101 which is being oscillated, and the reflected light ray is received by two beam detectors BD1 (1204) and BD2 (1205). The beam detector BD1 (1204) is disposed at a position where the scanning light is incident as the oscillation angle of the movable element 101 becomes equal to 30 deg., while the beam detector BD2 (1205) is disposed at a position where the scanning light is incident as the oscillation angle of the movable element 101 becomes equal to −30 deg. The light reception time interval from the moment whereat the light ray 802 goes over the beam detector BD1 (1204) to the moment whereat the light beam goes over the beam detector BD2 (1205) is measured by means of a time interval analyzer (not shown). From the scan unevenness as determined by the light receiving time interval between the beam detectors BD1 (1204) and BD2 (1205) for every scan, as measured as described above, the stability of the oscillation angle of the first movable element 101 is evaluated. In this case as well, the scan unevenness can be represented by the mean of peak-to-peak values of the light receiving time interval.

Figure 10:
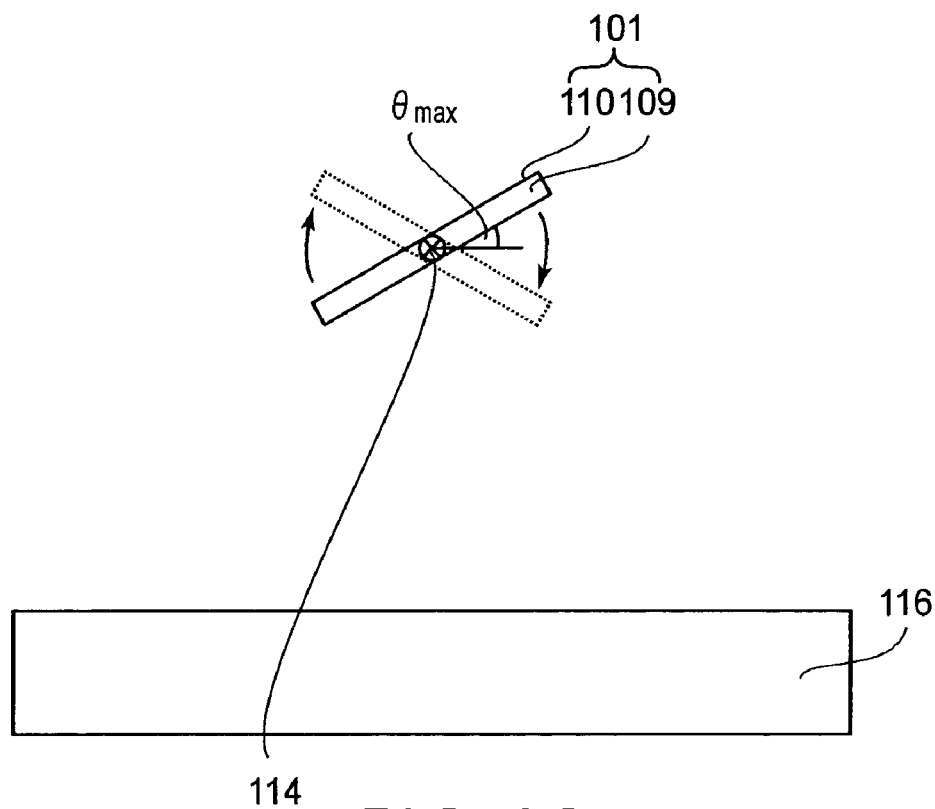
FIG. 10 is a diagram illustrating a comparative example used in the experiment.

The content of experiments will be described. In FIG. 9, the scan unevenness was measured at successive positions in the movement direction of the first rectifying member 106, second rectifying member 115 and damper member 107 when these were moved in direction of an arrow A. Here, the supporting base plate 116 and the damper member 107 have such structure that they can be easily demounted and the damper member 107 can be moved in the direction parallel to the A direction. With the movement in the A direction, L1 becomes gradually narrower from 0.25 mm, while L2 becomes gradually wider from 0.25 mm. Furthermore, as a comparative example, the scan unevenness of an optical deflector from which the first rectifying member 106, second rectifying member 115 and damper member 107 were completely removed, such as shown in FIG. 10, was measured.

Figure 11:
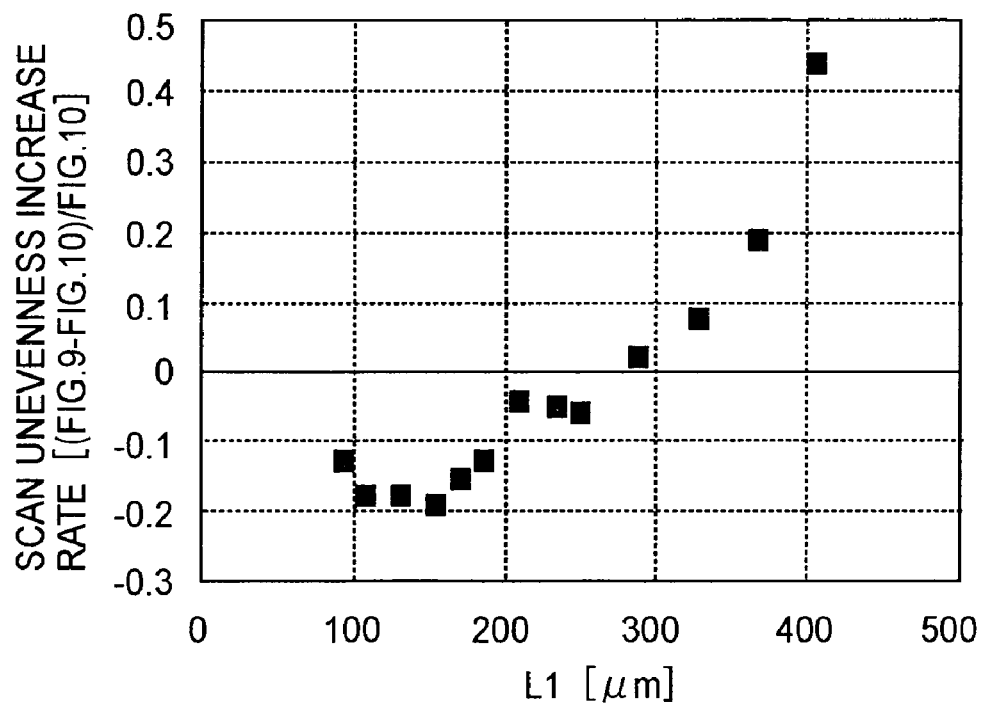
FIG. 11 is a graph showing the experimental results.

FIG. 11 shows the results of experiments. In FIG. 11, the axis of ordinate denotes the increasing rate of the scan unevenness of the optical deflector of FIG. 9, relative to the scan unevenness of the optical deflector of FIG. 10. The axis of abscissas denotes L1. It is seen from FIG. 11 that, when L1 of the optical deflector is from around 250 µm to around 100 µm, the scan unevenness is fewer than that of the optical deflector of FIG. 10 (i.e., the increasing rate is negative).

Thus, by making L1 and L2 different from each other or, alternatively, by setting L1 in the manner as described above, it can be said that the effect of reducing the scan unevenness of the scanning light which is just to be used, is obtainable.

Here, in the experiment system, BD1 (1204) corresponds to the measurement start point and BD2 (1205) corresponds to the measurement end point. It is seen that, by making L1 narrower than L2, instability of oscillation due to the spiral airflow at the measurement start point can be reduced furthermore and that the spiral airflow at the measurement start point has a large influence on the scan unevenness. Therefore, if to the contrary BD1 (1204) is taken as the measurement start point and BD2 (1205) is taken as the measurement end point, the aforementioned relationship is reversed as follows. Namely, L1 should be made larger than L2 and the size of L2 should be set in the range not less than 100 µm and not greater than 250 µm.

Figure 12:
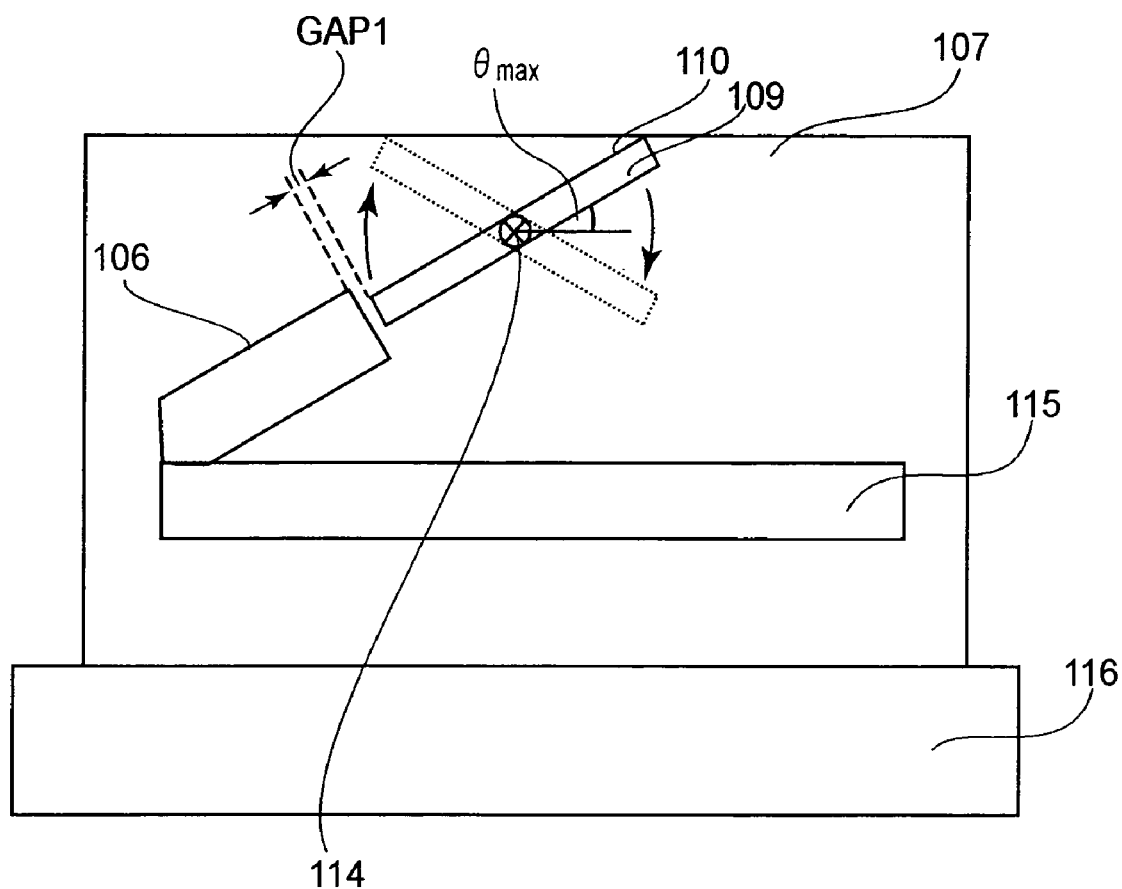
FIG. 12 is a diagram illustrating another comparative example used in the experiment.

Additionally, as shown in FIG. 12, the scan unevenness was measured by use of the experiment system of FIG. 9 without the first rectifying member 106 for defining GAP2 in the optical deflector of FIG. 9. In that occasion, the scan unevenness was not decreased so much even if L1 of GAP1 was changed. From this, it can be said that it would be preferable for the first rectifying member 106 to define not only GAP1 but also GAP2 to make L1 larger than L2. It should be noted however that the optical deflector shown in FIG. 12 enables scan unevenness improvements when the same is compared with the optical deflector shown in FIG. 10 and, thus, it is included in the scope of the present invention.

It can be said from the above that, in an optical deflector of the present embodiment, the measurement start point (writing start point by the scanning light) may preferably be set in the oscillation angle range of the movable element 201 from zero to θmax [deg.], the measurement end point (writing end point by the scanning light) may preferably be set in the range from −θmax to zero [deg.], and L1 may preferably be made larger than L2. Furthermore, it can be said that, if L1 is made larger than L2 and the size of L2 is set in a range not less than 100 µm and not greater than 250 µm, the scan unevenness of the scanning light during the oscillation of the movable element from θmax to −θmax can be reduced furthermore. If the optical deflector is used in an image forming apparatus, the measurement start point corresponds to the writing start point by the scanning light, and the measurement end point corresponds to the writing end point by the scanning light. Here, what has been described above similarly applies even if the displacement angle of the movable element from θmax to −θmax and the displacement angle of the movable element from −θmax to θmax change symmetrically like a sinusoidal wave or even if they change asymmetrically like a sawtooth wave. An example of the latter is oscillatory motion of the movable element in which the transition time from θmax to −θmax is longer than that from −θmax to θmax. It should be noted that the beam detector used in the aforementioned experiment system can be directly used in a practical apparatus as a component of detecting means for acquiring a detection signal for controlling the driving signal to be applied to the driving means of the oscillation system.

Sixth Embodiment

Figure 13:
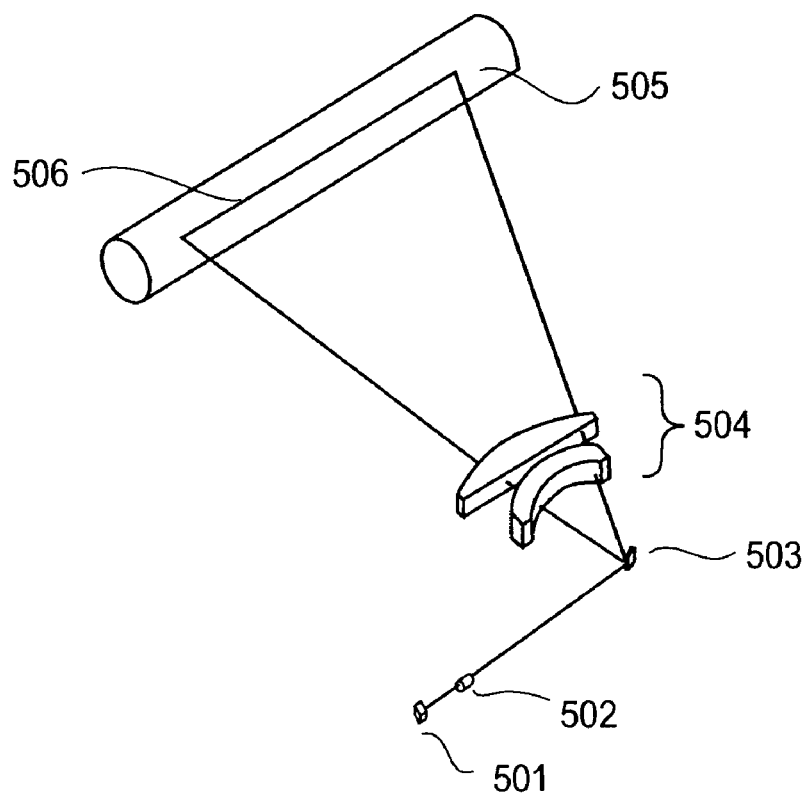
FIG. 13 is a diagram for explaining an optical equipment according to a sixth embodiment of the present invention.

FIG. 13 is a diagram showing an embodiment of an optical equipment using an optical deflector based on an oscillator device of the present invention. Here, an image forming apparatus is shown as the optical equipment. In FIG. 13, denoted at 503 is the optical deflector of the present invention which is arranged, in the present embodiment, to scanningly deflect an incident light beam one-dimensionally. Denoted at 501 is a laser source. Denoted at 502 is a lens or lens group. Denoted at 504 is a writing lens or lens group. Denoted at 505 is a photosensitive member which is the target on which the light beam should be incident. Denoted at 506 is a scan locus.

The laser beam projected from the laser source 501 undergoes predetermined intensity modulation related to the timing of the scanning deflection of the light, and then it is scanningly deflected one-dimensionally by the optical deflector 503. By the function of the writing lens 504, the thus scanned laser beam forms an image on the photosensitive member 505 which is rotating at a constant speed around the rotational center. The photosensitive member 505 is uniformly electrically charged a charging device (not shown). Thus, when it is scanned with light, an electrostatic latent image is formed on the scanned portion. Subsequently, a toner image is formed on the image portion of the electrostatic latent image by means of a developing device (not shown). This toner image is transferred to a paper sheet (not shown) and fixed thereon, by which an image is produced on the paper sheet. With the optical deflector of the present invention, the angular speed of the scanning deflection of the light can be made approximately constant angular speed within a specified range. Furthermore, with the use of the optical deflector of the present invention, an image forming apparatus which is able to produce images stably can be accomplished.

An optical deflector which is comprised of an oscillator device of the present invention including a movable element with a reflection surface, driving means for applying a torque to at least one movable element to oscillate the same, and a damper member, can be incorporated into a visual display unit. In that occasion, the optical deflector deflects the light from a light source and directs at least a portion of the light onto an image display member which is the target on which the light should be incident.

While the invention has been described with reference to the structures disclosed herein, it is not confined to the details set forth and this application is intended to cover such modifications or changes as may come within the purposes of the improvements or the scope of the following claims.

The invention claimed is:

1. An oscillator device, comprising:
   at least one movable element supported for oscillatory motion around a rotational axis; and
   a first rectifying member for suppressing generation of a spiral airflow during oscillation of said movable element;
   wherein said first rectifying member is provided to occupy a space of at least a portion of a spiral airflow generating region which might otherwise be created when said first rectifying member is not provided there, and
   wherein, when a largest oscillation angle of said movable element during oscillation is denoted by θmax, a shortest distance between said movable element when at θmax and said first rectifying member is denoted by L1, and a shortest distance between said movable element when at −θmax and said first rectifying member is denoted by L2, said first rectifying member is provided such that L1 and L2 are different from each other.

2. An oscillator device according to claim 1, wherein a reflection surface is formed on the at least one movable element, and wherein a driving device is provided to apply a torque to the at least one movable element to drive the same.

3. An oscillator device according to claim 2,
   wherein said oscillator device includes a supporting member,
   wherein the at least one moveable element includes a first moveable element having the reflection surface and at least one second moveable element, and
   wherein said first movable element and said second movable element are supported by a torsion spring for torsional oscillation, relative to said supporting member, about a torsion axis corresponding to the rotational axis.

4. An oscillator device according to claim 1, wherein at least a pair of said first rectifying members are disposed approximately symmetrically with respect to a plane which contains the rotational axis and which is perpendicular to a surface of said movable element when at its stationary position.

5. An oscillator device according to claim 1, wherein a plurality of said first rectifying members having a tabular shape are disposed in parallel to each other with a spacing interposed therebetween, so as to divide a spiral airflow in said spiral airflow generating region into plural spiral airflows.

6. An oscillator device according to claim 1, wherein said first rectifying member extends along a plane defined by extending the surface of said movable element when at a position ±θmax, in a direction perpendicular to the rotational axis thereof.

7. An oscillator device according to claim 1, wherein L1 is larger than L2 and wherein L1 has a size in a range not less than 100 μm and not greater than 250 μm.

8. An oscillator device according to claim 1, wherein a length of said first rectifying member in a direction of the rotational axis is larger than a length of said movable element in that direction.

9. An oscillator device according to claim 1, further comprising a second rectifying member having a surface parallel to or perpendicular to the surface of said movable element when at its stationary position, and wherein a shortest distance between said second rectifying member and said movable element is made larger than a shortest distance between said movable element and said first rectifying member.

10. An oscillator device according to claim 1, further comprising a damper member for applying a damping function to the oscillatory motion of said movable element, wherein said damper member is provided along at least a portion of a locus plane defined by an edge of said movable element during oscillation, so that the damping function is applied to the oscillatory motion of said movable element based on a viscosity of a fluid which is present between the edge of said movable element being oscillated and a portion of said damper member.

11. An optical instrument, comprising:
    a light source;
    an optical deflector having an oscillator device as recited in any one of claims 1-6 and 7-10
    a target member onto which light from said light source is to be incident;
    wherein said optical deflector is configured to deflect the light from said light source and to direct at least a portion of the light onto said target member.

* * * * *